Patented Apr. 19, 1927.

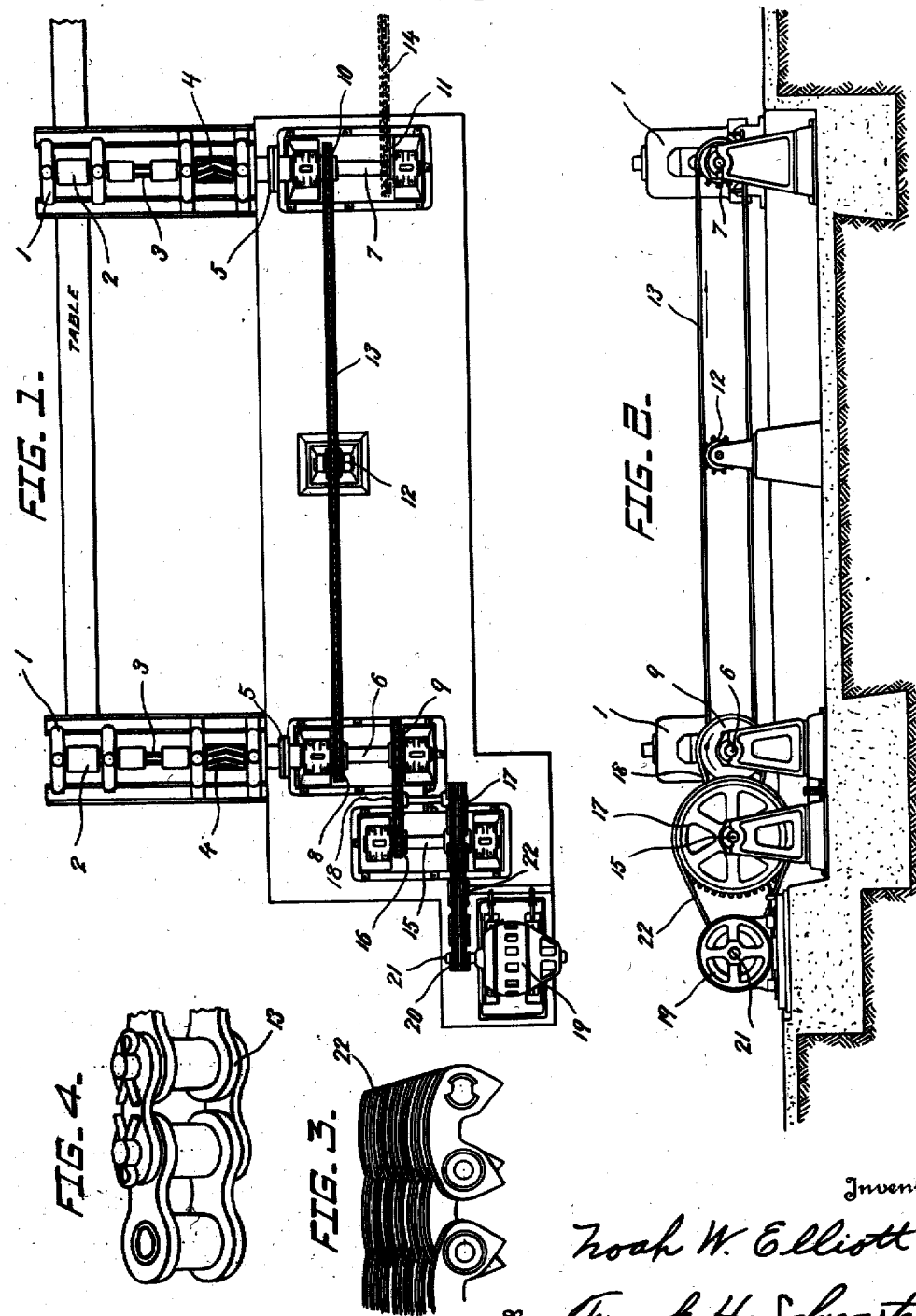

1,625,643

UNITED STATES PATENT OFFICE.

NOAH W. ELLIOTT, OF NEW CASTLE, PENNSYLVANIA.

ROLLING METAL.

Application filed August 17, 1925. Serial No. 50,618.

This invention relates to chain drives for rolling mills and comprises all improvements over the prior art which are disclosed in this application, and especially relates to the driving of strip mills or sheet-mills in tandem. It also relates to methods of producing metal strips or sheets.

One object is to provide a drive for rolling mills which will eliminate the objectionable wavy finish in the rolled product which results from the chatter in a gear and shaft driven mill.

Another object is to provide a semi-elastic drive that protects the entire mechanism from the shocks inherent in metal rolling operations.

Other objects are to provide a drive which will be positive, have high mechanical efficiency with a minimum of friction and wear and which will be substantially non-stretching.

The above and other objects which will hereinafter appear, are attained by improvements embodying new and useful features as disclosed in this application. To enable others skilled in the art to fully comprehend the essential features of the improvements, drawings illustrating a preferred form have been annexed as a part of this disclosure.

Fig. 1 is a plan view of a rolling mill provided with the chain drive.

Fig. 2 is an elevational view of Fig. 1.

Fig. 3 is a perspective view of a portion of silent chain.

Fig. 4 is a perspective view of a portion of roller chain.

The particular embodiment of the invention which is herein disclosed for illustrative purposes, comprises successive stands 1, 1 having pairs of rolls 2, 2 driven by wabblers 3, 3 from pairs of gears 4, 4. The lower gears of pairs 4, 4 are connected by couplings 5, 5 to shafts 6, 7 having sprockets secured thereto. Sprockets 8, 9 are secured to shaft 6 while sprocket 10 is secured to shaft 7. Intermediate sprockets 8, 10 is an idler 12, and extending over idler 12 and in driving engagement with sprockets 8, 10 is a chain 13, preferably a roller chain of well known form such for example as is illustrated in Fig. 4.

If it is desired to have a third stand of rolls (not shown), as indicated by dotted lines in Fig. 1 a sprocket 11 secured on shaft 7 may be connected preferably by roller chain 14 with a sprocket on a shaft connected to such a third stand of rolls.

Adjacent to shaft 6 is a shaft 15 having sprockets 16, 17 secured thereto, and connecting the smaller sprocket 16 on shaft 15 with the larger sprocket 9 on shaft 6 is preferably a roller chain 18. Adjacent shaft 15 is an electric motor 19 having a small sprocket 20 secured on its shaft 21 and connected with sprocket 17 preferably by a silent chain 22 of well known form such for example as is illustrated in Fig. 3. The sprockets 20 and 17 connected by the silent chain are usually of true spur gear form as is well known. Owing to the relatively high speed at which shaft 21 rotates, and therefore the high speed at which chain 22 travels, it is preferable to use a silent chain here. But chains 18 and 13 which are slower traveling need not be silent chains since roller chains serve satisfactorily for this purpose.

By using well made chains and sprockets, a substantially noiseless drive is provided which is positive and free from back lash and which is semi-elastic thereby protecting the entire mechanism from the shocks inherent in metal rolling operations. This results in a drive that causes the mill to run smoothly without chatter, which chatter in the drives in common use cause an objectionable wavy finish in the rolled product. This wavy finish occurs to a certain extent in hot rolled strip and sheet, but is much more pronounced in cold rolled strip and sheet due to the higher stresses occurring in cold rolling, and it is more objectionable since the required quality of commercial cold rolled finish is much higher than in the case of hot rolled. But with the chain drive a smooth high quality finish is consistently and continuously produced, which is free from all wavy finish.

Without further elaboration, this disclosure will so fully reveal the gist of the improvements that others can, by applying current knowledge, readily vary these improvements without omitting certain features that, from the standpoint of the prior art, fairly constitute essential characteristics of the generic and specific aspects of these improvements, and therefore such variations are intended to be comprehended within the meaning and range of equivalency of the following claims.

I claim:

1. A rolling mill comprising a plurality of successively arranged stands of rolls, sprocket means coaxial with and having a driving connection with one roll in each roll stand, roller chain means connecting the sprocket means of successive roll stands, a relatively high speed rotary power source provided with a primary sprocket, and chain and sprocket speed reduction gearing connecting said primary sprocket with one of said rolls, including a silent chain connected to said primary sprocket connection with one of said rolls and a silent chain connecting said two last mentioned sprockets.

2. A rolling mill comprising a plurality of successively arranged stands of rolls, sprocket means coaxial with and having a driving connection with one roll in each roll stand, chain means connecting the sprocket means of successive roll stands, a power source, and chain and sprocket speed reduction gearing connecting said power source with one of said rolls.

3. A rolling mill comprising a plurality of successively arranged stands of rolls, sprocket means coaxial with and having a driving connection with one roll in each roll stand, chain means connecting the sprocket means of successive roll stands, and a power source connected to one of said rolls by chain and sprocket means.

4. A rolling mill comprising a stand of rolls, a sprocket coaxial with and having a driving connection with one of said rolls, a power source provided with a sprocket, and driving chain means connecting said sprockets.

5. A rolling mill comprising a stand of rolls, a power source, and chain and sprocket driving means connecting said stand of rolls with said power source.

6. The method of producing a rolled strip or sheet of metal comprising the steps of driving a stand of rolls positively by a chain and sprocket, and simultaneously passing said strip or sheet therethrough whereby the resultant rolled strip is smooth and free of wavy finish.

7. The method of producing a rolled strip or sheet of metal comprising the steps of driving a plurality of successively arranged stands of rolls positively by chain and sprocket connection between a power source and one set of rolls and chain and sprocket connection between successive stands of rolls, and simultaneously passing said strip or sheet therethrough whereby the resultant rolled strip is smooth and free of wavy finish.

NOAH W. ELLIOTT.

means coaxial with and having a driving connection with one roll in each roll stand, roller chain means connecting the sprocket means of successive roll stands, a relatively high speed rotary power source provided with a primary sprocket, and chain and sprocket speed reduction gearing connecting said primary sprocket with one of said rolls, including a silent chain connected to said primary sprocket connection with one of said rolls and a silent chain connecting said two last mentioned sprockets.

2. A rolling mill comprising a plurality of successively arranged stands of rolls, sprocket means coaxial with and having a driving connection with one roll in each roll stand, chain means connecting the sprocket means of successive roll stands, a power source, and chain and sprocket speed reduction gearing connecting said power source with one of said rolls.

3. A rolling mill comprising a plurality of successively arranged stands of rolls, sprocket means coaxial with and having a driving connection with one roll in each roll stand, chain means connecting the sprocket means of successive roll stands, and a power source connected to one of said rolls by chain and sprocket means.

4. A rolling mill comprising a stand of rolls, a sprocket coaxial with and having a driving connection with one of said rolls, a power source provided with a sprocket, and driving chain means connecting said sprockets.

5. A rolling mill comprising a stand of rolls, a power source, and chain and sprocket driving means connecting said stand of rolls with said power source.

6. The method of producing a rolled strip or sheet of metal comprising the steps of driving a stand of rolls positively by a chain and sprocket, and simultaneously passing said strip or sheet therethrough whereby the resultant rolled strip is smooth and free of wavy finish.

7. The method of producing a rolled strip or sheet of metal comprising the steps of driving a plurality of successively arranged stands of rolls positively by chain and sprocket connection between a power source and one set of rolls and chain and sprocket connection between successive stands of rolls, and simultaneously passing said strip or sheet therethrough whereby the resultant rolled strip is smooth and free of wavy finish.

NOAH W. ELLIOTT.

CERTIFICATE OF CORRECTION.

Patent No. 1,625,643.  Granted April 19, 1927, to

NOAH W. ELLIOTT.

It is hereby certified that error appears in the printed specification of the above numbered patent requiring correction as follows: Page 2, lines 10 to 12, claim 1, strike out the words "connection with one of said rolls and a silent chain connecting said two last mentioned sprockets"; and that the said Letters Patent should be read with this correction therein that the same may conform to the record of the case in the Patent Office.

Signed and sealed this 10th day of May, A. D. 1927.

Seal.

M. J. Moore,
Acting Commissioner of Patents.

CERTIFICATE OF CORRECTION.

Patent No. 1,625,643.                      Granted April 19, 1927, to

NOAH W. ELLIOTT.

It is hereby certified that error appears in the printed specification of the above numbered patent requiring correction as follows: Page 2, lines 10 to 12, claim 1, strike out the words "connection with one of said rolls and a silent chain connecting said two last mentioned sprockets"; and that the said Letters Patent should be read with this correction therein that the same may conform to the record of the case in the Patent Office.

Signed and sealed this 10th day of May, A. D. 1927.

Seal.                                                              M. J. Moore,
                                                     Acting Commissioner of Patents.